United States Patent [19]
Eo et al.

[11] Patent Number: 6,069,574
[45] Date of Patent: May 30, 2000

[54] HADAMARD CODE GENERATION CIRCUIT

[75] Inventors: Ik Soo Eo; Kwang Il Yeon; Kyung Soo Kim, all of Daejeon, Rep. of Korea

[73] Assignees: Electronics and Telecommunications Research Institute, Daejeon; Korea Telecom, Seoul, both of Rep. of Korea

[21] Appl. No.: 09/138,545

[22] Filed: Aug. 24, 1998

[30] Foreign Application Priority Data

Oct. 24, 1997 [KR] Rep. of Korea ............ 97 54784

[51] Int. Cl.[7] .......... H03M 7/00; G06F 15/332; G06K 9/36
[52] U.S. Cl. ............ 341/50; 382/281
[58] Field of Search ............ 341/50; 382/281, 382/239; 708/410; 370/209

[56] References Cited

U.S. PATENT DOCUMENTS

| | | | |
|---|---|---|---|
| 5,311,176 | 5/1994 | Gurney ............ | 341/50 |
| 5,793,579 | 8/1998 | Rakib et al. ............ | 370/342 |
| 5,875,439 | 2/1999 | Engel et al. ............ | 706/41 |

*Primary Examiner*—Michael Tokar
*Assistant Examiner*—Peguy JeanPierre
*Attorney, Agent, or Firm*—Antonelli, Terry, Stout & Kraus,

[57] ABSTRACT

A hadamard code generation circuit is disclosed. The circuit includes a start reset signal generator for generating a start reset signal START_RESET when a 6-bit output signal REF_C from the 6-bit reference counter, a higher 4-bit index output signal H(5:2) of the 6-bit register and a 2-bit value from a ground circuit are identical; a "0" value force allocation unit for outputting a FORCE_0_DEL signal for forcibly allocating all values of the 0th column to "0" when a 4-bit output signal REF_C (5:2) from the 6-bit reference counter and a 4-bit value from the ground circuit are identical; a 2-bit counter for receiving the start reset signal and an external clock signal, outputting lowest bit signals C1 and C0 and outputting a carry-out signal; a 4-bit counter operated in accordance with a result that an inverted FORCE_0 signal and a carry-out signal are ANDed and outputting higher bit signals C4, C3 and C2; a 4th hadamard code generator for logically processing a lower 2-bit output signal from the 2-bit counter and a lower 2-bit index value from the 6-bit register and generating a 4-th hadamard code; a 12th paley code generator for generating a 12th paley code using an output signal from the counter and the FORCE_0_DEL signal and the ALL_ZERO signal; and a 48th hadamard code generator for logically processing a 4th hadamard code and a 12th paley code and generating a 48th hadamard code.

8 Claims, 9 Drawing Sheets

HADAMARD CODE GENERATION CIRCUIT

BACKGROUND OF THE INVENTION

1. Field of the Invention

The present invention relates to a hadamard code generation circuit employed for a wireless communication system of a CDMA for supporting a multiplexing subscriber, and in particular, to an improved hadamard code generation circuit which is capable of extending a 48th hadamard code among orthogonal codes employed for separating channels and users of a mobile communication. And this invention can concurrently generate a 48th hadamard code and the hadamard codes higher than the 48th hadamard code.

2. Description of the Conventional Art

Generally, in order to separate channels in a CDMA communication system, a orthogonal code is used. This orthogonal is used when separating a user or modulating a signal using an orthogonal characteristic of a code. Therefore, in the CDMA communication system, an orthogonal code generator is used for generating a signal and extracting a source signal containing orthogonal code.

In addition, in order to diverse the communication service, it is needed to increase the capacity for an increasing number of subscribers. Therefore, the number of orthogonal code is increasing as user channels are increasing.

A U.S. Pat. No. 5,311,176 entitled "Walsh code generation method and apparatus" is disclosed, which is directed to generating a multiplexing code. In the patent '176, a technique for generating a 64th hadamard code is disclosed.

FIG. 1 illustrates a conventional hadamard code generation circuit which is capable of generating a 4th hadamard code and a 64th hadamard code. The operation for generating a hadamard code will be explained with reference to FIG. 1.

Two AND gates 118 and 119 receive lower 2-bit (H(1:0)) among the output signals C0 and C1 from a 2-bit counter 112 and a lowest index 2 bits of index (H(5:0)) from a 6-bit register 114 and AND the thusly received signals. A XOR-gate 124 XORs the thusly ANDed signals for thereby generating a 4th hadamard code HOUT_L of a lower 2-bit.

In addition, a 4-bit counter 113 receives a carry-out signal from the 2-bit counter 112 and enables or disables the thusly received signal. XOR-gates 125 and 126 XOR the XOR-ed signals of AND-gates 120, 121, 122 and 123 which receive the higher 4-bit output signals (H(5:2)) among the output signals C5, C4, C3 and C2 from the 4-bit counter 113 and the MSB 4 bits of indexes from the 6-bit register 114. The XOR-gate 127 XORs the output signals from the XOR-gates 125 and 126 and a 4th hadamard code value from the XOR-gate 124 for thereby generating a 64th hadamard code HOUT_64.

In the conventional hadamard code generation circuit, a counter and selector are used. Then final hadamard code is generated through a binary addition operation of the mode signals selected. The counters are configured for 2-bit, 3-bit, 4-bit, 5-bit and 6-bit signals in accordance with the degree of the code. The value for selecting the output signals from the counters is determined by an index stored in a predetermined bit of register. The AND-gate multiplies the code index indicated by binary digit in the register and the output signal from the counter for thereby generating a final hadamard code by binary-summing the output values of the counters.

The 4th hadamard code will be explained.

As the elements of the hadamard matrix, "0 and 1" are used instead of "1 and −1". Therefore, the following matrix equations 1 and 2 are obtained based on "0 and 1".

$$H_2 = \begin{bmatrix} 0 & 0 \\ 0 & 1 \end{bmatrix} \quad \text{[Equation 1]}$$

$$H_4 = \begin{bmatrix} H_2 & H_2 \\ H_2 & \overline{H_2} \end{bmatrix} = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad \text{[Equation 2]}$$

$$H_2^n = \begin{bmatrix} H_2^{n-1} & H_2^{n-1} \\ H_2^{n-1} & \overline{H_2^{n-1}} \end{bmatrix} \quad \text{[Equation 3]}$$

Equation 3 is directed to a cross matrix in which "0 and 1" are crossed with respect to $H_2^{n-1}$ and $H_2^{n-1}$.

As described above, in the orthogonal codes used for the CDMA communication system, the 4th, 8th, 16th, 32th and 64th hadamard codes are conventionally used. However, there is not disclosed a method or apparatus for concurrently generating 48th hadamard codes or 48th and 64th hadamard codes.

Therefore, as the number of subscribers is increased based on the wide range of bandwidth, the extending capability of the orthogonal codes should be increased for the increasing number of the subscribers. In the conventional orthogonal codes, it is impossible to implement an extendable hadamard code generation circuit.

SUMMARY OF THE INVENTION

Accordingly, it is an object of the present invention to provide a hadamard code generation circuit which overcomes the aforementioned problems encountered in the conventional art.

It is another object of the present invention to provide a hadamard code generation circuit which is capable of generating a 48th hadamard code among orthogoanl codes which are used for generating a signal and extracting the generated signal in a CDMA communication system.

It is another object of the present invention to provide a hadamard code generation circuit which is capable of concurrently generating a 48th hadamard code and a 64th hadamard code for diversifying a communication service.

It is another object of the present invention to provide a hadamard code generation circuit which is capable of generating a higher degree of hadamard codes using 48th and 64th hadamard code generation circuits.

In order to achieve the above objects, there is provided a hadamard code generation circuit according to a first embodiment of the present invention which includes a 6-bit reference counter for outputting a signal REF_C having a 48-state in accordance with an external reset signal; a 6-bit register for outputting an ALL_ZERO signal in which all bits of 0th row are "0" and storing a 6-bit index value; a start reset signal generator for generating a start reset signal START_RESET when a 6-bit output signal REF_C from the 6-bit reference counter, a higher 4-bit index output signal H(5:2) of the 6-bit register and a 2-bit value from a ground circuit are identical; a "0" value force allocation unit for outputting a FORCE_0_DEL signal for forcibly allocating all values of the 0th column to "0" when a FORCE_0 signal is one clock delayed; a FORCE_0 is generated when a 4-bit output signal REF_C (5:2) from the 6-bit reference counter and a 4-bit value from the ground circuit are identical; a 2-bit counter for receiving the start reset signal and an external clock signal, outputting lowest bit signals C1 and C0 and outputting a carry-out signal; a 4-bit counter operated in accordance with a result that an inverted FORCE_0 signal and a carry-out signal are ANDed and outputting higher bit signals C4, C3 and C2; a 4th hadamard code generator for logically processing a lower 2-bit output signal from the 2-bit counter and a lower 2-bit index value from the 6-bit register and generating a 4-th hadamard code; a 12th paley code generator for generating a 12th paley code using an output signal from the counter and the FORCE_0_DEL signal and the ALL_ZERO signal; and a 48th hadamard code generator for logically processing a 4th hadamard code and a 12th paley code and generating a 48th hadamard code.

In order to achieve the above objects, there is provided a hadamard code generation circuit according to a second embodiment of the present invention which includes a 6-bit reference counter for outputting an output signal REF_C having a 48-state in accordance with an external reset signal; a 6-bit register for outputting an ALL_ZERO signal in which all bits of a 0th row are "0" and storing a 6-bit index value; a start reset signal generator for selecting a higher 4-bit index output signal H(5:2) or a 4-bit signal from a ground circuit in accordance with lower 2 bits ground by an external mode signal and generating a start reset signal START_RESET when the selected signal and an output signal from the reference counter are identical; a zero value force allocation unit for outputting a FORCE_0_DEL signal for forcibly allocating all values of the 0th column to "0" when FORCE_0_DEL signal is generated by one clock delay of FORCE_0; FORCE_0 is generated when a higher 4-bit output signal REF_C(5:2) from the 6-bit reference counter and a 4-bit value from the ground circuit are identical; a 2-bit counter for receiving the start reset signal and an external clock signal, outputting lowest signal C1 and C0 and outputting a carry-out signal; a 4-bit counter operated in accordance with a result that a FORCE_0 signal and a selection signal are non-logically ANDed and a result that the carry-out signals are ANDed for outputting the higher bit signals C5, C4, C3 and C2; a 4th and 64th hadamard code generator for logically processing output signals from the 2-bit counter and the 4-bit counter and a 6-bit index value from the 6-bit register and generating a 4th hadamard code and 64th hadamard code; a 12th paley code generator for generating a 12th paley code using an output signal from the 4-bit counter and the FORCE_0_DEL signal and the ALL_ZERO signal; a 48th hadamard code generator for logically operating the 4th hadamard code and the 12th paley code and generating a 48th hadamard code; and a selector for selecting the 48th or 64th hadamard codes in accordance with a control of the selection mode.

In order to achieve the above objects, there is provided a hadamard code generation circuit according to a third embodiment of the present invention which includes a 6-bit reference counter for outputting an output signal REF_C and a reference carry-out output signal REF_CARRY_OUT having a 48-state in accordance with an external reset signal; a 7-bit register for outputting an ALL_ZERO signal in which all bits of the 0th row are "0" and storing a 7-bit index value; a start reset signal generator for selecting a higher 4-bit index output signal H(5:2) or a 4-bit signal from a ground circuit in accordance with a mode signal MODE and generating a start reset signal START_RESET when the selected signal and an output signal from the reference counter are identical; a "0" value force allocation unit for outputting a FORCE_0_DEL signal for forcibly allocating all values of the 0th column to "0" when FORCE_0_DEL signal is generated by on clock delay of FORCE_0; FORCE_0 is generated when a higher 4-bit output signal REF_C(5:2) from the 6-bit reference counter and a 4-bit value from a ground circuit are identical; a 2-bit counter for receiving a start reset signal and an external clock signal, outputting a lowest bit C1, C0 and outputting a carry-out signal; a 4-bit counter operated in accordance with a resultant value that a FORCE_0 signal and a selection mode signal are ANDed and a resultant value that the carry-out signals are ANDed for outputting higher bit signals C5, C4, C3 and C2; a 1-bit counter operated in accordance with a start_reset output signal from the 6-bit counter for outputting a highest bit signal C6; a 4th and 64th hadamard code generator for logically operating the output signals from the 2-bit counter and the 4-bit counter, logically operating a 6-bit index value from the 6-bit register and generating a 4th hadamard code and a 64th hadamard code; a 12th paley code generator for generating a 12th paley code using an output signal from the 4-bit counter and a FORCE_0_DEL signal and an ALL_ZERO signal; a 48th hadamard code generator for logically operating a 4th hadamard code and 12th paley code and generating a 48th hadamard code; and a 96th and 128th hadamard code generator for generating a 96th hadamard code by exclusively ORing a resultant value, which an output signal from the 1-bit counter and an output signal H(6) from the 7-bit register are ANDed, with a 48th hadamard code when the mode signal "1" and generating a 128th hadamard code by exclusively ORing the 64th hadamard codes when the mode signal is "0".

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
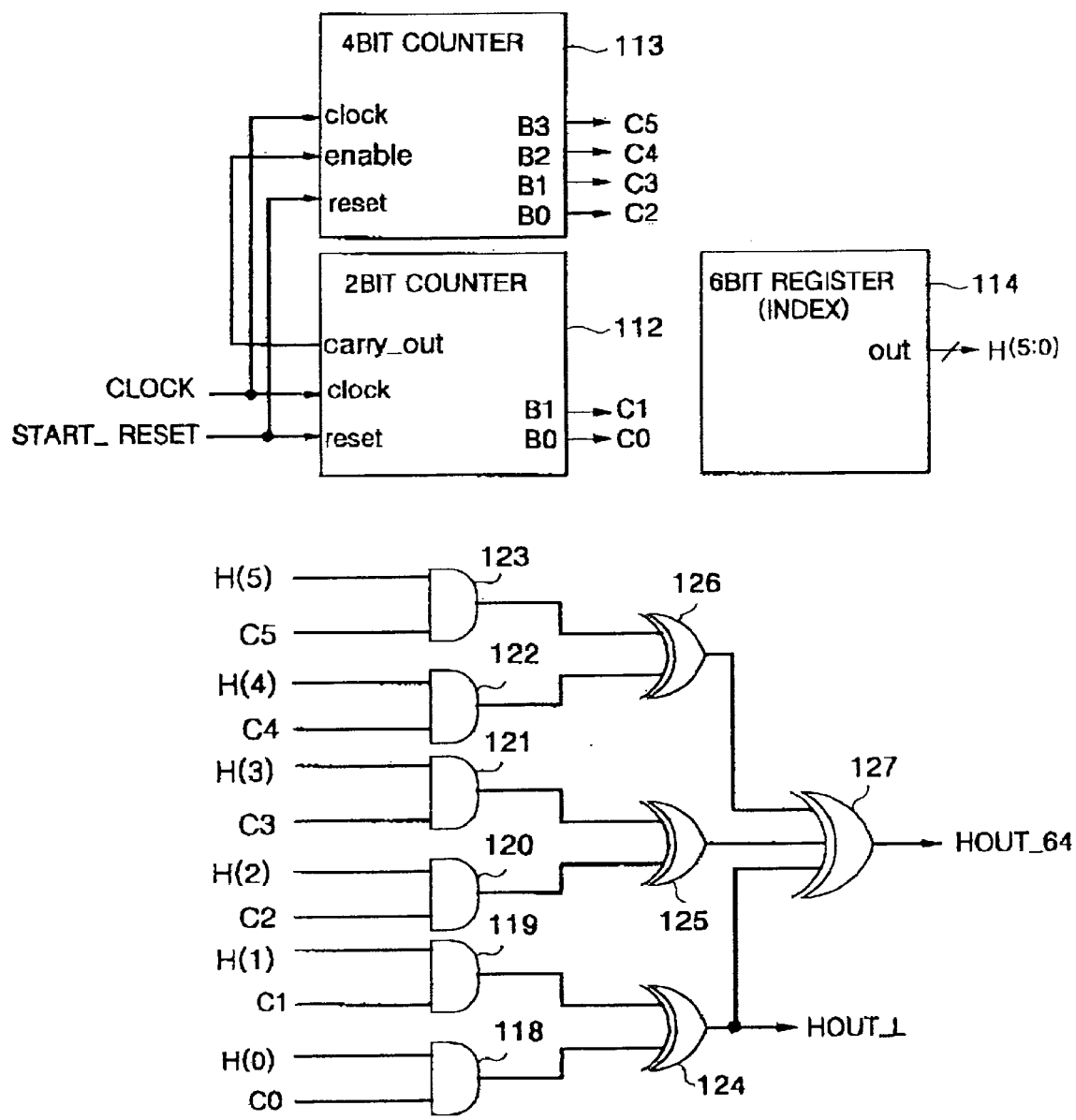
FIG. 1 is a circuit diagram illustrating a circuit for generating 4th and 64th hadamard codes in the conventional art.

The method for generating a 12th paley code which is used for generating a 48th hadamard code will be explained. A 12th paley code is generated based on the following Equation 4.

$$H_n = \begin{bmatrix} 1 & 1 \\ 1^T & Q_{n-1} - I_{n-1} \end{bmatrix}$$ [Equation 4]

$$q_{ij} = x(j - i)$$

$x(x) = 0$ if $x$ is a multiple of $p$ $x(x) = 1$ if $x$ is a quadratic residue module of $p$ $x(x) = -1$ if $x$ is a quadratic nonresidue module of $p$

| 0 | 0 |
|---|---|
| 1 | $1 = mod(1/11)$ |
| 2 | $4 = mod(4/11)$ |
| 3 | $9 = mod(9/11)$ |
| 4 | $5 = mod(16/11)$ |
| 5 | $3 = mod(25/11)$ |
| 6 | $3 = mod(36/11)$ |
| 7 | $5 = mod(49/11)$ |
| 8 | $9 = mod(64/11)$ |
| 9 | $4 = mod(81/11)$ |
| 10 | $1 = mod(100/11)$ |

The elements of 0th column of the Jacobsthal matrix $Q_p$ obtained using the residue value of Equation 4 are shown in the following Table 1

TABLE 1

| 0 | 1 | 2 | 3 | 4 | 5 | 6 | 7 | 8 | 9 | 10 |
|---|---|---|---|---|---|---|---|---|---|---|
| −1 | 1 | −1 | 1 | 1 | 1 | −1 | −1 | −1 | 1 | −1 |

Here, −1 is substituted with 1, and 1 is substituted with 0. Therefore, the 12th hadamard code shown in Table 2 is obtained.

TABLE 2

| | 0 | 0 | 0 | 0 | 0 | 0 | 0 | 0 | 0 | 0 | 1 | 1 |
| | 0 | 1 | 2 | 3 | 4 | 5 | 6 | 7 | 8 | 9 | 0 | 1 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 1 | 0 | 1 | 0 | 0 | 0 | 1 | 1 | 1 | 0 | 1 |
| 2 | 0 | 1 | 1 | 0 | 1 | 0 | 0 | 0 | 1 | 1 | 1 | 0 |
| 3 | 0 | 0 | 1 | 1 | 0 | 1 | 0 | 0 | 0 | 1 | 1 | 1 |
| 4 | 0 | 1 | 0 | 1 | 1 | 0 | 1 | 0 | 0 | 0 | 1 | 1 |
| 5 | 0 | 1 | 1 | 0 | 1 | 1 | 0 | 1 | 0 | 0 | 0 | 1 |
| 6 | 0 | 1 | 1 | 1 | 0 | 1 | 1 | 0 | 1 | 0 | 0 | 0 |
| 7 | 0 | 0 | 1 | 1 | 1 | 0 | 1 | 1 | 0 | 1 | 0 | 0 |
| 8 | 0 | 0 | 0 | 1 | 1 | 1 | 0 | 1 | 1 | 0 | 1 | 0 |
| 9 | 0 | 0 | 0 | 0 | 1 | 1 | 1 | 0 | 1 | 1 | 0 | 1 |
| 10 | 0 | 1 | 0 | 0 | 0 | 1 | 1 | 1 | 0 | 1 | 1 | 0 |
| 11 | 0 | 0 | 1 | 0 | 0 | 0 | 1 | 1 | 1 | 0 | 1 | 1 |

In the 12th paley code, all elements of the 0th column and the 0th row are "0", and in the 11th column of the 1st row from the 1st column of the 1st row, the codes are generated in a sequence of 1010/0011/101. In addition, in the 1st column of the second row, the codes are generated in a sequence from the 11th column of the 1st row to the 10th column of the 1st row. Namely, the value of 1010/0011/101 is changed in a sequence of 1101/0001/110 and is generated in the 2nd row.

Namely, the values of the final column of the pervious row in the 3rd row and all next row are changed to the value of the 1st column of a new row, and the next column values are sequentially delayed. Namely, the value of 1010/0011/101 of the 1st column of the 1st row is circulated. In addition, in accordance with the characteristic of 1010/0011/101, the LSB (Least significant Bit) of the 3-bit counter and the output of the second lower bit signal are alternately outputted. The 1st LSB and 2nd LSB values are selected by the 3rd LSB. In addition, the 0th column value is "0". Therefore, the start time of the counter is determined based on the value of the hadamard code index. The 0th column has "0" at the time of an external reference for thereby forming a 12th paley code generation circuit.

A first embodiment of the present invention will be explained.

Figure 2:
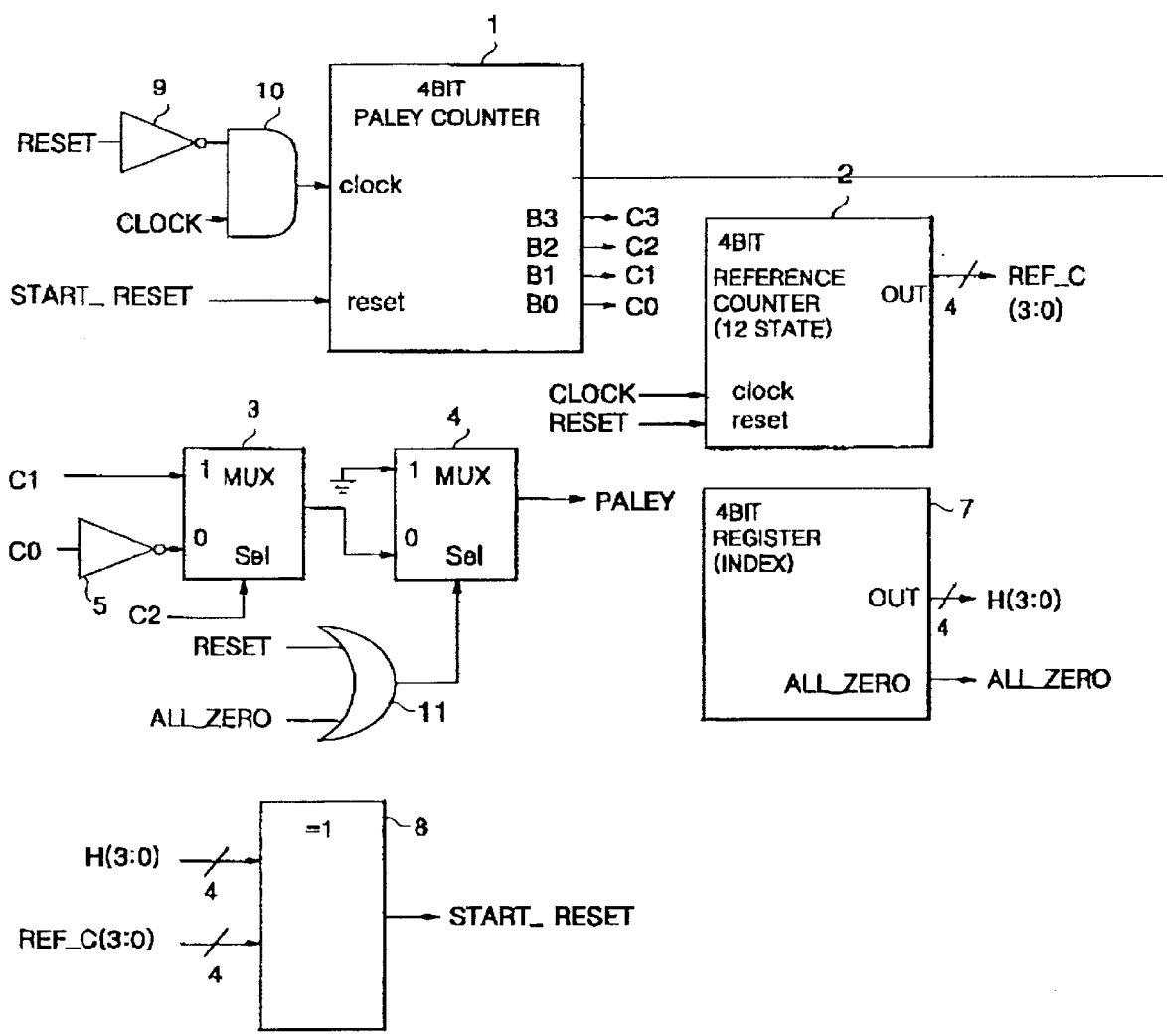
FIG. 2 is a circuit diagram illustrating a circuit for generating a 12th paley code according to the present invention.

FIG. 2 illustrates a circuit for generating a 12th paley code. A 4-bit reference counter 2 has 12 states in accordance with an external reset signal. The index stored in the 4-bit register 7 and an output signal from the 4-bit reference register 7 are compared by a comparator 8. As a result of the comparison, if two values are identical, a reset signal START_RESET of the 4-bit paley counter 1 is generated. Therefore, the reset signal START_RESET of the 4-bit paley counter 1 is generated at another time in accordance with an index value. In addition, in the interval in which the external reset signal RESET is "1", the reset signal is outputted through the inverted gate 9 as a negative result value. The AND-gate 10 ANDs the output signal and clock signal. In the interval in which the external reset signal RESET is "1", the 4-bit paley counter 1 does not operate.

In addition, in accordance with the characteristic of the 12th paley code, the values of the 1st row and 1st column are "0", and the values from the 1st column to the 11th column at 1st row is "10100011101". These values are sequentially outputted. Namely, the values of 1010/0011/101 are repeatedly outputted.

The LSB (C0) of the 4-bit paley counter 1 continuously generates "01010101", and the second LSB (C1) continuously generates "00110011". As a result, in the values of the 11th column from the 1st row of the 1st column, the output signal LSB (C0) from the counter 1 is outputted four times as a value inverted by the inverted gate 5. The second LSB (C1) signal of the counter 1 is outputted four times. The LSB (C0) of the counter is outputted three times. The signals C0 and C1 are alternately outputted. The signal selecting the above-described two signals is selected by the selector 3 in accordance with a control of the signal C2 from the 4-bit paley counter 1. Namely, when the value C2 becomes 0, the inverted signal C0 inverted by the inverted gate 5 is outputted. When the value C2 becomes 1, the signal C1 is outputted. The signal outputted from the selector 3 is selected by the selector 4 in accordance with a selection signal which is obtained by ORing the ALL_ZERO signal and external reset signal from the 4-bit register 7 for thereby finally generating a paley code. In order to implement the above-described operation, the inverted gate 5, the selectors 3 and 4 and the OR-gate 11 are used.

In addition, the operation of the counter is stopped in accordance with an external reset signal, and one state is generated. Totally, 12 signals are generated. The 0 signal of the 1st row is generated in accordance with an external reset signal. According to the circulation characteristic of the paley code, if each index value and the output signal from the 4-bit paley counter 1 are identical, the paley codes are generated by the reset signal start_reset from the comparator 8.

All values of the 0th column become for the reason that all output signals are made to become "0" by generating a signal all_zero by detecting that all bit signals from the 4-bit register 7 become "0" like the method for forcibly including "0".

Figure 3:
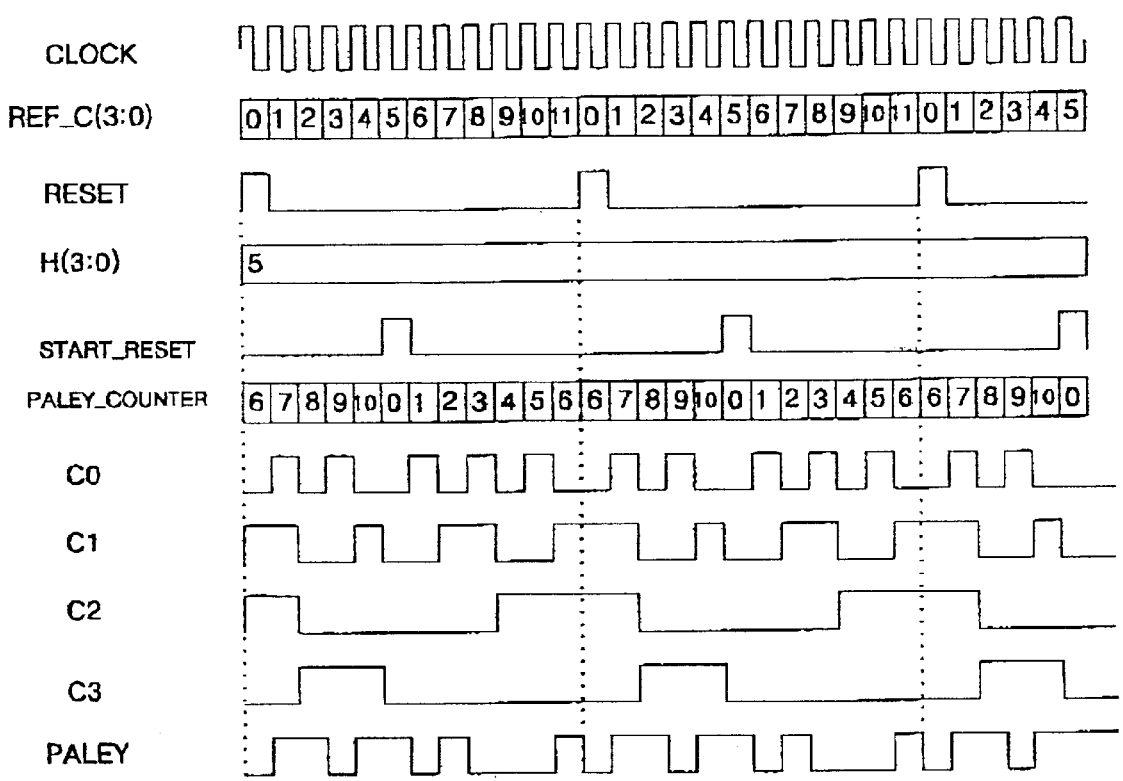
FIG. 3 is a wave form diagram when a 12th paley code is generated using the circuit of FIG. 2.

FIG. 3 is a wave form when a 12th paley code is generated using the circuit of FIG. 2. The circuit for generating a 12th paley code will be explained with reference to FIG. 2.

The output signal from the 4-bit reference counter 2 becomes "0" in accordance with an external reset signal. If the output signal from the counter 2 is identical with the index value from the 4-bit register 7, a reset signal start_reset is applied to the counter 1. The paley code generated in accordance with an output value from the counter 1 is as follows: "XXXXX1010001/"0"11011010001/ "0"11011010001". This value is identical with 0, 4, 8, 12, 16, 20, 24, 28, 32, 36, 40, and 44 as shown in the table of 48th hadamard code table of Table 3. The "0" in the value stream is inserted in accordance with an external reset signal.

A second embodiment according to the present invention will be explained.

Figure 4:
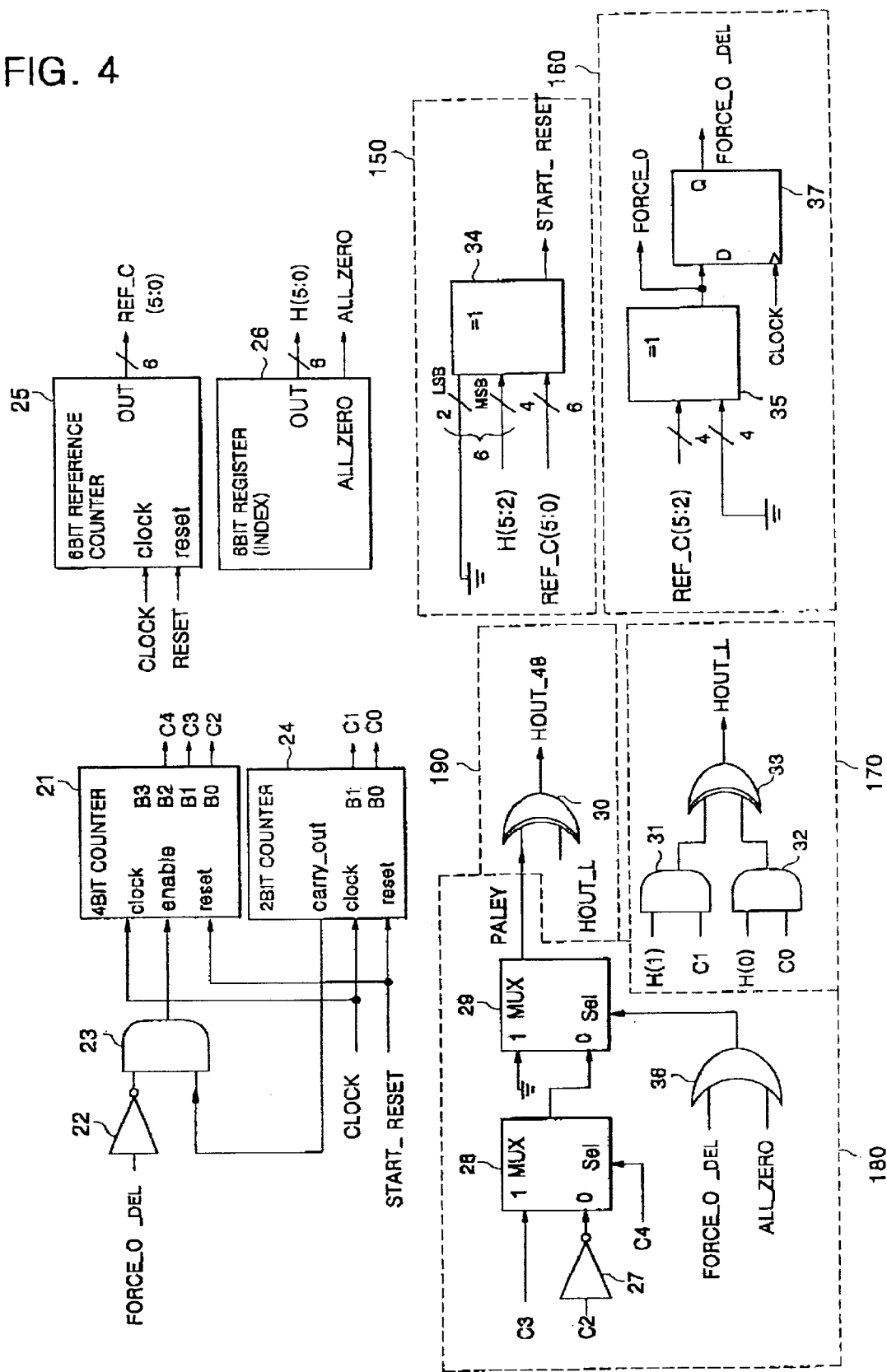
FIG. 4 is a circuit diagram illustrating a circuit for generating a 48th hadamard code using the 12th paley code generation circuit according to the present invention.

FIG. 4 illustrates a circuit for generating a 48th hadamard code using the circuit of FIG. 1.

Namely, the circuit generates a 48th hadamard code using the 12th paley code.

FIG. 4 illustrates an extended circuit by adding a 2-bit counter 24 to the 12th paley code generation circuit of FIG. 2.

The 6-bit reference counter 25 has a 48-state in accordance with an external reset signal, receives a clock signal CLOCK and an external reset signal RESET and outputs a REF_C (5:0). In addition, the 6-bit register 26 outputs an index H(5:0) and ALL_ZERO signal stored in the register 26. The comparator 34 which is a start reset signal generator 150 compares the REF_C(5:0) output signal from the 6-bit reference counter 25, the index H(5:2) from the 6-bit register 26, and a 2-bit signal from the ground circuit. As a result of the comparison, if the values are identical, a reset signal START_RESET of "1" is outputted.

In addition, the comparator 35 which is a zero value force allocation unit 160 compares the REF_C (5:2) from the 6-bit reference counter 25 and the 4-bit signal from the ground circuit. As a result of the comparison, if the values are different, the output signal of "0" is outputted through a D-flipflop 37 as a FORCE_0_DEL signal.

The FORCE_0 signal is inputted into the inverted gate 22 and then is inverted and inputted into the AND-gate 23. The 4-bit counter 21 is operated in accordance with a carry-out signal from the 2-bit counter 24.

At the time when the output signals from the 6-bit reference counter 25 and the index register 26 become identical, the counters 21 and 24 are reset.

In the 4th hadamard code generator 170, the output signal C(1:0) from the 2-bit counter 24 and the output signal H(1:0) from the 6-bit register 26 are ANDed, and the a result of the ANDing operation is exclusively ORed by the XOR-gate 33 for thereby generating a lower 2-bit 4th hadamard code HOUT_L.

The 12th paley code generator 180 includes an inverted gate 27, selectors 28 and 29, and an OR-gate 36. The output signal C3 or the signal that the output signal C2 is inverted by the inverted gate 27 is selected in accordance with a control of the output signal C4 from the 4-bit counter 21. The output signal FORCE_0_DEL from the D-flipflop 37 and the ALL_ZERO signal from the 6-bit register 26 are ORed by the OR-gate 36, and an output signal from the selector 28 is selected in accordance with a result of the ORing operation for thereby generating a paley code having a 12-state.

The XOR-gate 30 which acts as the 48th hadamard code generator 190 exclusively ORs the 12th paley code value and the lower 4th hadamard value for thereby finally generating a 48th hadamard code.

Figure 5:
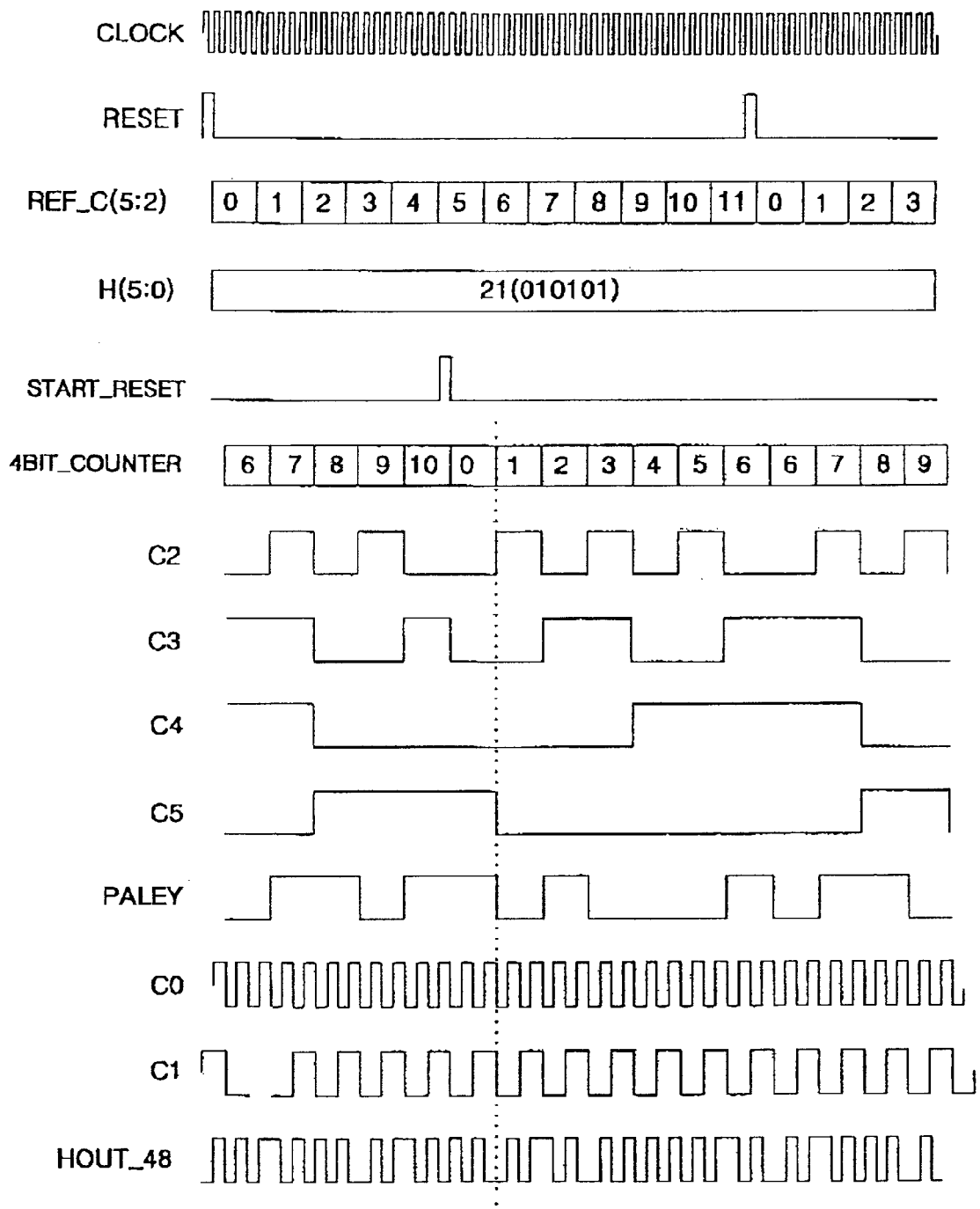
FIG. 5 is a wave form diagram when a 48th hadamard code is generating using the circuit of FIG. 4.

FIG. 5 is a wave form when the 48th hadamard code of FIG. 3 is generated. The 4th hadamard code HOUT_L of the index 1 is generated in accordance with a lower 2-bit H(1:0) among the 6-bit index H(5:0), and the 5th index paley code is generated in accordance with the higher 4-bit H(5:2).

A third embodiment of the present invention will be explained.

Figure 6:
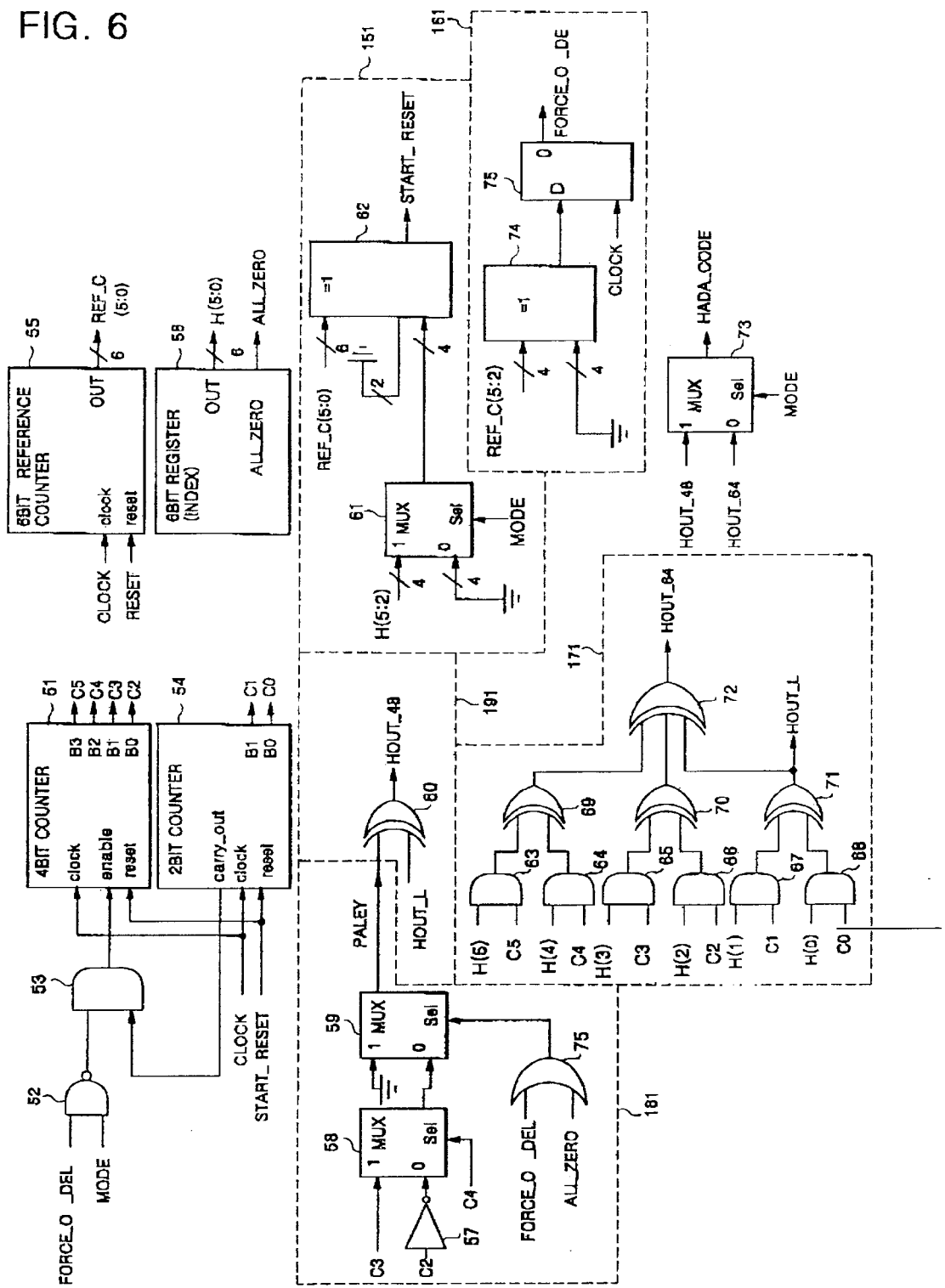
FIG. 6 is a circuit diagram illustrating a circuit for concurrently generating 48th and 64th hadamard codes according to the present invention.

FIG. 6 illustrates a circuit for generating 48th and 64th hadamard codes.

The circuit generating 48th and 64th hadamard codes will be explained with reference to FIG. 6.

The 6-bit reference counter 55 receives an external clock signal and a reset signal and outputs a REF_C (5:0). The 6-bit register 56 outputs an index H(5:0) and an ALL_ZERO signal stored in the register. At this time, an external input reset signal differs at the reset time in accordance with the mode. In the case of 48th code, it has 48-state, and in the case of 64th code, it has 64-state.

The start reset signal generator 151 includes a selector 61 and a comparator 62. The selector 61 selects the 4-bit index H(5:2) or the 4-bit signal from the ground circuit in accordance with a control of an externally inputted selection mode. The comparator 62 compares the 4-bit output signal selected by the selector 61, the 2-bit output signal from the ground circuit and the 6-bit output REF_C (5:0) signal from the 6-bit reference counter 55. As a result of the comparison, if the output signals are identical, the start reset signal START_RESET is inputted into the 2-bit counter 54 together with the external clock signal.

The 2-bit counter 54 outputs the lower 2-bit output signals C1 and C0 and the carry-out signal.

In addition, the "0" value force allocation unit 161 includes a comparator 74 and a D-flip-flop 75. The comparator 74 compares the 4-bit output REF_C(5:2) signal and the 4-bit output signal from the ground circuit. As a result of the comparison, the FORCE_0 signal is output through the D-flipflop 75. The FORCE_0 signal and the selection mode signal are NANDed by the NAND-gate 52. The thusly NANDed result and the carry-out signal from the 2-bit counter 54 are ANDed by the AND-gate 53. Namely, the 4-bit counter 51 is operated in accordance with a carry-out signal from the 2-bit counter 54. The 4-bit counter 51 outputs 4-bit output signals (C5:C2).

The 48th hadamard code HOUT_48 includes a 12th paley code generator 181 and a 48th hadamard code generator 191. Namely, the output signal C2 from the 4-bit counter 51 inverts the inverted gate 57, and the selector MUX 58 selected the inverted signal or the signal C3 in accordance with a signal C4. In addition, the OR-gate 75 ORs the FORCE_0_DEL signal and the ALL_ZERO signal. The output signal from the selector 58 is selected by the selector 59 in accordance with a result of the ORing operation. The 12th paley value from the selector 59 and the lower 4th hadamard value are exclusively ORed by the XOR-gate 60 for thereby generating a 48th hadamard code HOUT_48.

The 64th hadamard code HOUT_64 is generated by the 4th and 643th hadamard code generator 171. Namely, the output signals C1 and C0 from the 2-bit counter 54 and the output signal H(1:0) from the 6-bit register 56 are ANDed by the AND-gages 68 and 67 and is XORed by the XOR-gate 71 for thereby generating a 4th hadamard code HOUT_L. In addition, the output signals (C5:C2) from the 4-bit counter 51 and the output signal H(5:2) from the 6-bit register 56 are ANDed by the AND gates 66, 65, 64 and 63. The exclusive ORing operation is performed by the XOR-gates 70 and 69. The output signal from each XOR-gate and the 4th hadamard code are exclusively ORed by the XOR-gate 72. As a result, the 64th hadamard code HOUT_64 is generated.

The 48th hadamard code HOUT_48 and the 64th hadamard code HOUT_64 are selected by the selector 73 in accordance with a signal of the selection mode MODE for thereby generating a final code HADA_CODE. Namely, in the case of "0", the 64th hadamard code is generated by the selector 73 in accordance with a control of the selection mode signal. In the case of "1", the 48th hadamard code is generated.

Figure 7:
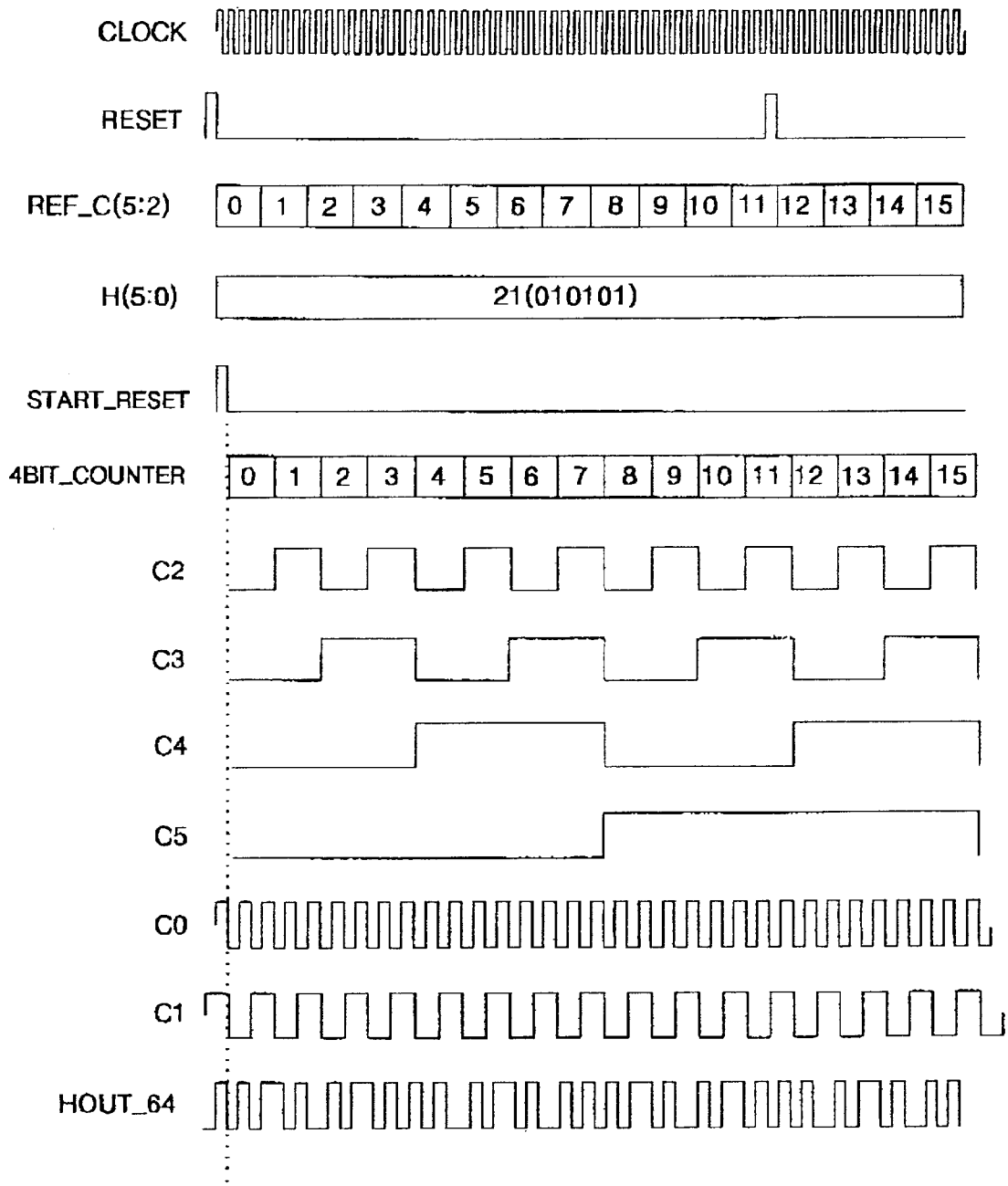
FIG. 7 is a wave form diagram when 48th and 64th codes are concurrently generated using the circuit of FIG. 6.

FIG. 7 illustrates a wave form when 48th and 64th codes are generated using the circuit of FIG. 6. The 48th code is generated by exclusively ORing the 12th paley code PALEY and the 4th hadamard HOUT_L. In the case of the 64th code, the signals C4, C2 and C0 are selected in accordance with an index H(5:0) among the output signals C5, C4, C3, C2, C2 and C0 from the 6-bit counter, and all selected values are ANDed for thereby generating a final code HOUT_64.

Since the circuit for generating the hadamard codes includes a counter, it is possible to easily implement a 64th hadamard code generation circuit using a 48th hadamard code generation circuit. In addition, an extended 96th code is easily generated by multiplying the 48th hadamard code using the higher bit counter. Higher extended codes may be implemented.

The following table 3 and 4 illustrate the 48th and 64th hadamard codes.

In Table 3, the colored portions represent "1" of the 12th paley code, and the white portions represent "0". In Table 3, the 4th hadamard code is included in the interior of the 12th code.

TABLE 3

|   | 0000 0123 | 0000 4567 | 0011 8901 | 1111 2345 | 1111 6789 | 2222 0123 | 3333 4567 | 2233 8901 | 3333 2345 | 3333 6789 | 4444 0123 | 4444 4567 |
|---|---|---|---|---|---|---|---|---|---|---|---|---|
| 0 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 0000 | 0000 | 1111 | 1111 | 1111 | 0000 | 1111 |
| 5 | 0101 | 1010 | 0101 | 1010 | 0101 | 0101 | 0101 | 1010 | 1010 | 1010 | 0101 | 1010 |
| 6 | 0011 | 1100 | 0011 | 1100 | 0011 | 0011 | 0011 | 1100 | 1100 | 1100 | 0011 | 1100 |
| 7 | 0110 | 1001 | 0110 | 1001 | 0110 | 0110 | 0110 | 1001 | 1001 | 1001 | 0110 | 1001 |
| 8 | 0000 | 1111 | 1111 | 0000 | 1111 | 0000 | 0000 | 0000 | 1111 | 1111 | 1111 | 0000 |
| 9 | 0101 | 1010 | 1010 | 0101 | 1010 | 0101 | 0101 | 0101 | 1010 | 1010 | 1010 | 0101 |
| 10 | 0011 | 1100 | 1100 | 0011 | 1100 | 0011 | 0011 | 0011 | 1100 | 1100 | 1100 | 0011 |
| 11 | 0110 | 1001 | 1001 | 0110 | 1001 | 0110 | 0110 | 0110 | 1001 | 1001 | 1001 | 0110 |
| 12 | 0000 | 0000 | 1111 | 1111 | 0000 | 1111 | 0000 | 0000 | 0000 | 1111 | 1111 | 1111 |
| 13 | 0101 | 0101 | 1010 | 1010 | 0101 | 1010 | 0101 | 0101 | 0101 | 1010 | 1010 | 1010 |
| 14 | 0011 | 0011 | 1100 | 1100 | 0011 | 1100 | 0011 | 0011 | 0011 | 1100 | 1100 | 1100 |
| 15 | 0110 | 0110 | 1001 | 1001 | 0110 | 1001 | 0110 | 0110 | 0110 | 1001 | 1001 | 1001 |
| 16 | 0000 | 1111 | 0000 | 1111 | 1111 | 0000 | 1111 | 0000 | 0000 | 0000 | 1111 | 1111 |
| 17 | 0101 | 1010 | 0101 | 1010 | 1010 | 0101 | 1010 | 0101 | 0101 | 0101 | 1010 | 1010 |
| 18 | 0011 | 1100 | 0011 | 1100 | 1100 | 0011 | 1100 | 0011 | 0011 | 0011 | 1100 | 1100 |
| 19 | 0110 | 1001 | 0110 | 1001 | 1001 | 0110 | 1001 | 0110 | 0110 | 0110 | 1001 | 1001 |
| 20 | 0000 | 1111 | 1111 | 0000 | 1111 | 1111 | 0000 | 1111 | 0000 | 0000 | 0000 | 1111 |
| 21 | 0101 | 1010 | 1010 | 0101 | 1010 | 1010 | 0101 | 1010 | 0101 | 0101 | 0101 | 1010 |
| 22 | 0011 | 1100 | 1100 | 0011 | 1100 | 1100 | 0011 | 1100 | 0011 | 0011 | 0011 | 1100 |
| 23 | 0110 | 1001 | 1001 | 0110 | 1001 | 1001 | 0110 | 1001 | 0110 | 0110 | 0110 | 1001 |
| 24 | 0000 | 1111 | 1111 | 1111 | 0000 | 1111 | 1111 | 0000 | 1111 | 0000 | 0000 | 0000 |
| 25 | 0101 | 1010 | 1010 | 1010 | 0101 | 1010 | 1010 | 0101 | 1010 | 0101 | 0101 | 0101 |
| 26 | 0011 | 1100 | 1100 | 1100 | 0011 | 1100 | 1100 | 0011 | 1100 | 0011 | 0011 | 0011 |
| 27 | 0110 | 1001 | 1001 | 1001 | 0110 | 1001 | 1001 | 0110 | 1001 | 0110 | 0110 | 0110 |
| 28 | 0000 | 0000 | 1111 | 1111 | 1111 | 0000 | 1111 | 1111 | 0000 | 1111 | 0000 | 0000 |
| 29 | 0101 | 0101 | 1010 | 1010 | 1010 | 0101 | 1010 | 1010 | 0101 | 1010 | 0101 | 0101 |
| 30 | 0011 | 0011 | 1100 | 1100 | 1100 | 0011 | 1100 | 1100 | 0011 | 1100 | 0011 | 0011 |
| 31 | 0110 | 0110 | 1001 | 1001 | 1001 | 0110 | 1001 | 1001 | 0110 | 1001 | 0110 | 0110 |
| 32 | 0000 | 0000 | 0000 | 1111 | 1111 | 1111 | 0000 | 1111 | 1111 | 0000 | 1111 | 0000 |
| 33 | 0101 | 0101 | 0101 | 1010 | 1010 | 1010 | 0101 | 1010 | 1010 | 0101 | 1010 | 0101 |
| 34 | 0011 | 0011 | 0011 | 1100 | 1100 | 1100 | 0011 | 1100 | 1100 | 0011 | 1100 | 0011 |
| 35 | 0110 | 0110 | 0110 | 1001 | 1001 | 1001 | 0110 | 1001 | 1001 | 0110 | 1001 | 0110 |
| 36 | 0000 | 0000 | 0000 | 0000 | 1111 | 1111 | 1111 | 0000 | 1111 | 1111 | 0000 | 1111 |
| 37 | 0101 | 0101 | 0101 | 0101 | 1010 | 1010 | 1010 | 0101 | 1010 | 1010 | 0101 | 1010 |
| 38 | 0011 | 0011 | 0011 | 0011 | 1100 | 1100 | 1100 | 0011 | 1100 | 1100 | 0011 | 1100 |
| 39 | 0110 | 0110 | 0110 | 0110 | 1001 | 1001 | 1001 | 0110 | 1001 | 1001 | 0110 | 1001 |
| 40 | 0000 | 1111 | 0000 | 0000 | 0000 | 1111 | 1111 | 1111 | 0000 | 1111 | 1111 | 0000 |
| 41 | 0101 | 1010 | 0101 | 0101 | 0101 | 1010 | 1010 | 1010 | 0101 | 1010 | 1010 | 0101 |
| 42 | 0011 | 1100 | 0011 | 0011 | 0011 | 1100 | 1100 | 1100 | 0011 | 1100 | 1100 | 0011 |
| 43 | 0110 | 1001 | 0110 | 0110 | 0110 | 1001 | 1001 | 1001 | 0110 | 1001 | 1001 | 0110 |
| 44 | 0000 | 0000 | 1111 | 0000 | 0000 | 0000 | 1111 | 1111 | 1111 | 0000 | 1111 | 1111 |
| 45 | 0101 | 0101 | 1010 | 0101 | 0101 | 0101 | 1010 | 1010 | 1010 | 0101 | 1010 | 1010 |
| 46 | 0011 | 0011 | 1100 | 0011 | 0011 | 0011 | 1100 | 1100 | 1100 | 0011 | 1100 | 1100 |
| 47 | 0110 | 0110 | 1001 | 0110 | 0110 | 0110 | 1001 | 1001 | 1001 | 0110 | 1001 | 1001 |

TABLE 4

|   | 0000 0123 | 0000 4567 | 0011 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

Figure 8:
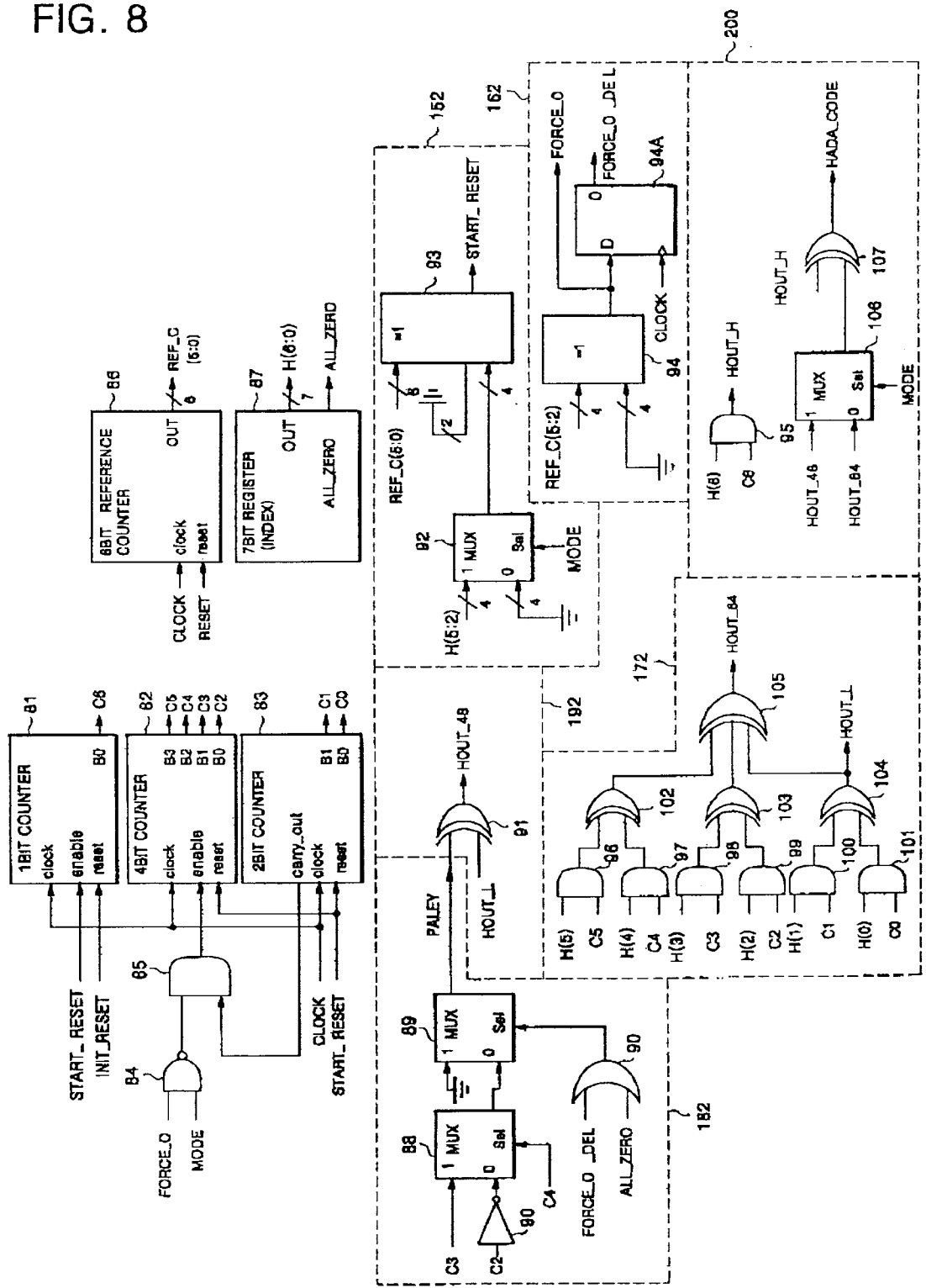
FIG. 8 is a circuit diagram illustrating a circuit for generating extended 96th and 128th codes using 48th and 64th hadamard code generation circuits according to the present invention.

FIG. 8 illustrates a circuit for generating extended 96th and 128th codes using 48th and 64th code generation circuits. The circuit for generating an extended code will be explained with reference to FIG. 7. Since the construction as shown in FIG. 8 is similar with the construction as shown in FIG. 5, the descriptions on the identical elements and reference numerals are omitted.

As shown in FIG. 8, the 1-bit counter 81 is operated in accordance with the start signal for thereby outputting an output signal C6. And the 1 bit counter 81 is resetted by init_reset. The init_reset is initiallized reset signal. In addition, the 7-bit register 87 is used instead of the 6-bit register as shown in FIG. 5 for thereby outputting an index H(6:0) stored in the register. The output signal C6 from the 1-bit counter 81 and the output signal H(6) from the 7-bit register 87 are ANDed by the AND-gate 95 for thereby outputting a HOUT_H signal. The 64th or 48th signal selected by the selector 106 and the HOUT_ signal are exclusively ORed by the XOR-gate 107 in accordance with a mode signal for thereby generating a final code HADA_CODE. Namely, the extended 96th and 128th codes are generated. Here, in the case of the 48th code, the value of the index H(5:2) has a maximum value of 11. However, in the case of 64th code, the value of the index H(5:2) has a maximum value of 15.

The 96th and 128th hadamard code generator 200 includes an AND-gate 95, a selector 106, and a XOR-gate 107. In the code generator 200, in the case of 96th code, since the mode signal has "1", and the value H(6) is "1", the output signal C6 from the 1-bit counter 81 and the 48th hadamard code HOUT_48 are multiplied for thereby generating a final 69th index hadamard code HOUD_CODE. In addition, in the case of 128th code, the mode signal has "0". The 64th hadamard code HOUT_64 is multiplied in accordance with an output signal C6 from the higher 1-bit counter 81.

Figure 9:
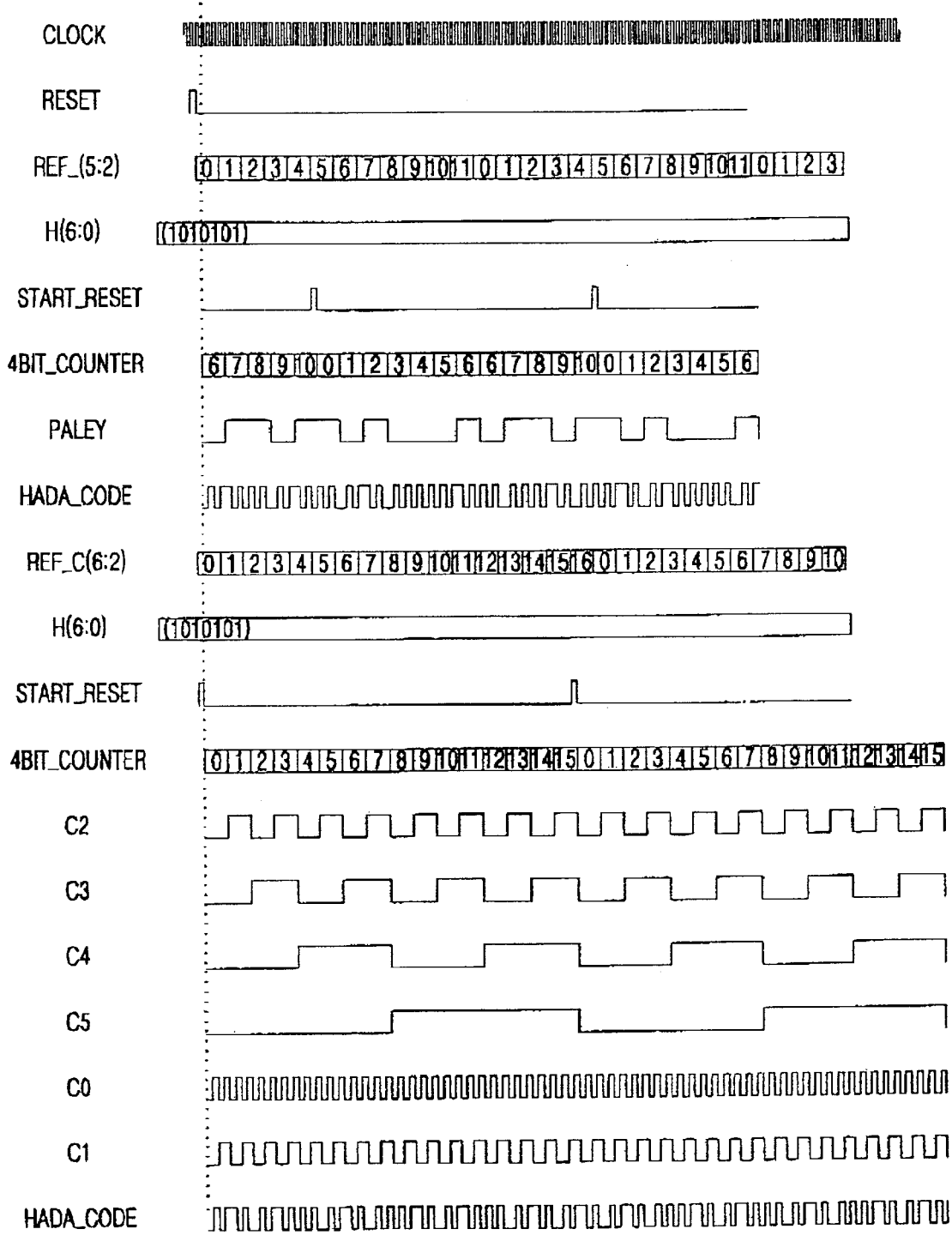
FIG. 9 is a wave form diagram when 96th and 128th hadamard codes are generated using the circuit of FIG. 8.

FIG. 9 illustrates a waveform when a 96th hadamard code is generated using the extended generation circuit of FIG. 8.

As described above, in the present invention, the 12th paley code is generated using a counter based on the 48th hadamard code generation circuit. The 48th hadamard code and a hadamard code higher than the 48th hadamard code are generated using the 12th paley code. In addition, the above-described circuit is similar with the construction of the 64th code generation circuit, so that the 48th and 64th hadamard code generation circuits are concurrently implemented.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A hadamard code generation circuit, comprising:

a 6-bit reference counter for outputting a signal REF_C having a 48-state in accordance with an external reset signal;

a 6-bit register for outputting an ALL_ZERO signal in which all bits of 0th row are "0" and storing a 6-bit index value;

a start reset signal generator for generating a start reset signal START_RESET when a 6-bit output signal REF_C from the 6-bit reference counter, a higher 4-bit index output signal H(5:2) of the 6-bit register and a 2-bit value from a ground circuit are identical;

a "0" value force allocation unit for outputting a FORCE_0_DEL signal for forcibly allocating all values of the 0th column to "0" when a 4-bit output signal REF_C (5:2) from the 6-bit reference counter and a 4-bit value from the ground circuit are identical;

a 2-bit counter for receiving the start reset signal and an external clock signal, outputting lowest bit signals C1 and C0 and outputting a carry-out signal;

a 4-bit counter operated in accordance with a result that an inverted FORCE_0 signal and a carry-out signal are ANDed and outputting higher bit signals C4, C3 and C2;

a 4th hadamard code generator for logically processing a lower 2-bit output signal from the 2-bit counter and a lower 2-bit index value from the 6-bit register and generating a 4-th hadamard code;

a 12th paley code generator for generating a 12th paley code using an output signal from the counter and the FORCE_0_DEL signal and the ALL_ZERO signal; and a 48th hadamard code generator for logically processing a 4th hadamard code and a 12th paley code and generating a 48th hadamard code.

2. The circuit of claim 1, wherein said "0" value force allocation unit includes:

a comparator; and a D-flipflop for delaying an output signal from the comparator for a predetermined time.

3. The circuit of claim 1, wherein said 12th paley code generator includes:

an inverted gate for inverting an output signal C2 from the counter;

a selector for selecting an inverted output signal C2 or an output signal C3 in accordance with a control of the output signal C4;

an OR-gate for forcibly applying "0" to the paley code in accordance with a logic operation of the FORCE_0_DEL signal and the ALL_ZERO signal; and a selector for outputting an output signal selected by the selector as a 12th paley code in accordance with an output signal from the OR-gate.

4. The circuit of claim 1, wherein said 48th hadamard code generator includes an exclusive OR-gate.

5. A hadamard code generator, comprising:

a 6-bit reference counter for outputting an output signal REF_C having a 48-state in accordance with an external reset signal;

a 6-bit register for outputting an ALL_ZERO signal in which all bits of a 0th column are "0" and storing a 6-bit index value;

a start reset signal generator for selecting a higher 4-bit index output signal H(5:2) or a 4-bit signal from a ground circuit in accordance with an external mode signal and generating a start reset signal START_RESET when the selected signal and an output signal from the reference counter are identical;

a zero value force allocation unit for outputting a FORCE_0_DEL signal for forcibly allocating all values of the 0th column to "0" when a higher 4-bit output signal REF_C(5:2) from the 6-bit reference counter and a 4-bit value from the ground circuit are identical;

a 2-bit counter for receiving the start reset signal and an external clock signal, outputting lowest signal C1 and C0 and outputting a carry-out signal;

a 4-bit counter operated in accordance with a result that a FORCE_0 signal and a selection signal are non-logically ANDed and a result that the carry-out signals are ANDed for outputting the higher bit signals C5, C4, C3 and C2;

a 4th and 64th hadamard code generator for logically processing output signals from the 2-bit counter and the 4-bit counter and a 6-bit index value from the 6-bit register and generating a 4th hadamard code and 64th hadamard code;

a 12th paley code generator for generating a 12th paley code using an output signal from the 4-bit counter and the FORCE_0_DEL signal and the ALL_ZERO signal;

a 48th hadamard code generator for logically operating the 4th hadamard code and the 12th paley code and generating a 48th hadamard code; and a selector for selecting the 48th or 64th hadamard codes in accordance with a control of the selection mode.

6. The circuit of claim 5, wherein said 4th and 64th hadamard code generator logically operates a lower 2-bit output signal H(1:0) from the 6-bit register and a lower 2-bit output signal (C2:C0) from the 2-bit counter, logically operates a result of the logical operation using an exclusive OR-gate, generates a 4th hadamard code, logically operates the 4-bit output signal H(5:2) and an output signal (C5:C2) from the 4-bit counter using the OR-gates, logically operates a result of the logical operation using the OR-gate, logically operates the 4th hadamard code using the exclusive OR-gate, and finally generates a 64th hadamard code.

7. The circuit of claim 6, wherein said selector is a multiplexor.

8. A hadamard code generation circuit, comprising:

a 6-bit reference counter for outputting an output signal REF_C and a reference carry-out output signal REF_CARRY_OUT having a 48-state in accordance with an external reset signal;

a 7-bit register for outputting an ALL_ZERO signal in which all bits of the 0th column are "0" and storing a 7-bit index value;

a start reset signal generator for selecting a higher 4-bit index output signal H(5:2) or a 4-bit signal from a ground circuit in accordance with a mode signal MODE and generating a start reset signal START_RESET when the selected signal and an output signal from the reference counter are identical;

a "0" value force allocation unit for outputting a FORCE_0_DEL signal for forcibly allocating all values of the 0th column to "0" when a higher 4-bit output signal REF_C(5:2) from the 6-bit reference counter and a 4-bit value from a ground circuit are identical;

a 2-bit counter for receiving a start reset signal and an external clock signal, outputting a lowest bit C1, C0 and outputting a carry-out signal;

a 4-bit counter operated in accordance with a resultant value that a FORCE_0 signal and a selection mode signal are ANDed and a resultant value that the carry-out signals are ANDed for outputting higher bit signals C5, C4, C3 and C2;

a 1-bit counter operated in accordance with a reference carry-out output signal from the 6-bit counter for outputting a highest bit signal C6;

a 4th and 64th hadamard code generator for logically operating the output signals from the 2-bit counter and the 4-bit counter, logically operating a 6-bit index value from the 6-bit register and generating a 4th hadamard code and a 64th hadamard code;

a 12th paley code generator for generating a 12th paley code using an output signal from the 4-bit counter and a FORCE_0_DEL signal and an ALL_ZERO signal;

a 48th hadamard code generator for logically operating a 4th hadamard code and 12th paley code and generating a 48th hadamard code; and a 96th and 128th hadamard code generator for generating a 96th hadamard code by exclusively ORing a resultant value, which an output signal from the 1-bit counter and an output signal H(6) from the 7-bit register are ANDed, with a 48th hadamard code when the mode signal "1" and generating a 128th hadamard code by exclusively ORing the 64th hadamard codes when the mode signal is "0".

* * * * *